July 23, 1963  R. F. DE MARCO  3,098,574
HYDRAULICALLY DRIVEN INDUSTRIAL TRUCK
Filed June 8, 1961  9 Sheets-Sheet 1

INVENTOR.
ROBERT F. DeMARCO
BY
*[signature]*
his ATTORNEY.

INVENTOR.
ROBERT F. DEMARCO
BY
ATTORNEY

FIG. 5

| | 203 | 202 | 200 | 180 | 181 | 183 | 189 | 212 | 200 | 196 | 197 | 207 | 208 | 205 | 206 |
|---|---|---|---|---|---|---|---|---|---|---|---|---|---|---|---|
| FORWARD | X | X | X | X | | | | HIGH SPEED | X | TILT | LIFT | | | X | |
| REVERSE | X | X | X | | X | | | | X | | | | | | X |
| FWD SHARP RIGHT | X | X | X | X | | | X | | X | | | | X | X | |
| FWD SHARP LEFT | X | X | X | X | | X | X | | X | | | X | X | X | |
| REV. SHARP RIGHT | X | X | X | | X | | X | | X | | | | X | | X |
| REV. SHARP LEFT | X | X | X | | X | X | X | | X | | | X | X | | X |
| | | | | | | | | AS REQ | | AS REQ | AS REQ | | | | |

FIG. 16

INVENTOR.
ROBERT F. DE MARCO
BY
*John H. Leonard*,
*his* ATTORNEY.

| | STEERING LIMIT SWITCHES | | | | REVERSING RELAY 147 | | | | | | | | SOLENOIDS | | | |
|---|---|---|---|---|---|---|---|---|---|---|---|---|---|---|---|---|
| | 141X | 141Y | 143X | 143Y | 147 WC | 147 XC | 147 YC | 147 ZC | 147 WO | 147 XO | 147 YO | 147 ZO | 84a | 85a | 84 | 85 |
| FWD. | X | X | X | X | X | X | X | X | | | | | X | X | X | X |
| REV. | X | X | X | X | | | | | X | X | X | X | X | X | X | X |
| FWDR | X | X | X | | X | X | X | | | | | X | X | X | X | |
| FWDL | | X | X | X | X | X | | X | | | X | | X | X | | X |
| REV R | X | X | | X | | | X | | X | X | | X | X | | X | X |
| REV L | X | | X | X | | X | | | X | | X | X | | X | X | X |

FIG. 11

INVENTOR.
ROBERT F. DE MARCO
BY
ATTORNEY

July 23, 1963 R. F. DE MARCO 3,098,574
HYDRAULICALLY DRIVEN INDUSTRIAL TRUCK
Filed June 8, 1961 9 Sheets-Sheet 7

FIG. 12

INVENTOR.
ROBERT F. DE MARCO
BY
John H. Leonard,
his ATTORNEY.

July 23, 1963 R. F. DE MARCO 3,098,574
HYDRAULICALLY DRIVEN INDUSTRIAL TRUCK
Filed June 8, 1961 9 Sheets-Sheet 9

INVENTOR.
ROBERT F. DeMARCO
BY
*John H. Leonard,*
*his* ATTORNEY

# United States Patent Office 3,098,574
Patented July 23, 1963

3,098,574
HYDRAULICALLY DRIVEN INDUSTRIAL TRUCK
Robert F. De Marco, Mentor, Ohio, assignor to The Heifred Corporation, Willoughby, Ohio, a corporation of Ohio
Filed June 8, 1961, Ser. No. 115,721
17 Claims. (Cl. 214—674)

This invention relates to industrial trucks, and particularly to industrial lift trucks of the general type used in and about factories.

Due to the arrangement of main and lateral aisles in factories, industrial hoist trucks should be as short and narrow as possible consistent with the load to be carried, and should have as short a turning radius and as small an inch-pound ratio as possible.

For maneuvering in such confined working spaces, they are required to travel and work at very slow speeds much of the time. In conventional electric trucks, resistors or rheostats are used to reduce the voltage to the main electric driving motor for obtaining these slower speeds. Prolonged slow speed travel damages the resistors and rheostats yet impose a full ampere drain on the battery.

The hydraulic transmission means of the present invention permit efficient prolonged travel at any and all speeds without causing excessive heating of the various components, without wasting and dissipating as heat the power in the battery, while at the same time providing infinitely variable speed control. The acceleration and deceleration are by such minute increments as to be exceedingly smooth, so that precise "inching" is provided when required for maneuvering loads at extending heights.

Prior trucks of this type also employ individual electric motors for driving the power transmissions of the traction wheels and for driving the hydraulic pumps for operating the hoist and for tilting the mast and the like. A plurality of small individual electric motors of given rated horsepower delivery cannot deliver the total rated horsepower as efficiently as can a single large electric motor having a rated horsepower equal to the total of that of the smaller motors. The smaller motors require a battery substantially larger than that required by a single large motor in order to provide equivalent performance. Likewise, the total size and weight of the small motors is greater than that of a single equivalent large motor.

Again, in trucks of this nature, differentials are employed for the traction wheels. These differentials require relatively large housings which must be arranged adjacent to the traction wheels, usually at the same end of the truck as the hoist. As a result, the mast of the hoist must be spaced forwardly a greater distance than would be necessary were the differential omitted, thereby increasing the inch-pound ratio of the truck, and also the truck length.

As a result, the flexibility heretofore obtainable in such trucks with gasoline engines and gasoline motor operated electric motor-generator power sources is obtained for the first time, by a battery powered truck, at high efficiency and in a small size range in relation to load.

Accordingly, the use of differentials and of a plurality of small motors is inconsistent with a truck of minimum length, width, and weight relative to pay load, and of minimum turning radius and inch-pound ratio.

In accordance with the present invention, instead of a plurality of small motors, a single large electric motor is used for driving the various powered mechanisms on the truck, thus reducing the space and the weight required for motor, battery, and controls. Instead of the conventional drive of the traction wheels, the traction wheels are driven by individual hydraulic motors, each of which is controllable both as to direction and speed of rotation independently of the other. The hoist and mast are operated by conventional hydraulic piston and cylinder assemblages. The pressure fluid for operating both the motors and the hoist is supplied by a single pump, or two pumps, driven by the one large electric motor of the truck.

Differentials interconnecting the traction wheels are unnecessary. As a result, the mast of the hoist can be moved closer to the traction wheels, thereby reducing the inch-pound ratio. Since a single electric motor and its battery are less in weight and require less space than a plurality of motors and their battery, the truck is more compact, and accessory control and support equipment are reduced in size and amount. These factors contribute greatly to a reduction in the length and width of the truck for a given load capacity.

Since the hydraulic motors may be independently controlled as to both speed and direction and the length of the truck is greatly shortened, the turning radius is extremely short.

The pressure fluid is supplied by a single variable delivery pump, or a plurality of variable delivery pumps driven by the shaft of the single constant speed motor operating at high efficiency and without the use of resistors and the like. The amount of pressure fluid delivered may be controlled by a single control means which varies both delivery and direction of flow of the pump, but a non-reversible pump with a control means to vary its delivery only and with the direction of flow controlled by simple reversing directional valves and employing an open system is preferred, as the matter of cooling the pressure fluid is simplified. Mechanical braking is preferred and, when employed, heating of the pressure fluid by dynamic braking is not present.

In event the mechanical braking fails, hydraulic dynamic braking and locking become effective.

The truck speed remains substantially constant, regardless of the load, or grade, throughout the creeping speed range.

Thus the control and operating parts required are reduced in number and many accessory control parts are eliminated, resulting in reductions in weight, size, and maintenance cost.

Power steering can be provided without specialized steering mechanisms.

Broadly, the present invention is directed to an industrial truck having a chassis with a pair of driving wheels and hydraulic motors drivingly connected to the wheels, respectively, a hoist carried by the chassis, and piston and cylinder assemblages for operating the hoist and for tilting its mast; a single motor, preferably an electric motor, having a driving shaft, and hydraulic pump means connected to the opposite ends of the shaft, respectively; hydraulic circuits connecting at least one pump to the hydraulic motors of the wheels and one pump to the assemblages; and means for controlling the volume and direction of flow of pressure fluid to the hydraulic motors of the wheels and to the assemblages, respectively; and means for diverting pressure fluid from the hoist and mast assemblages for effective over-drive of the traction wheels.

More specifically, the invention includes a truck in which the hydraulic motor of each wheel is connected to a separate variable delivery pump, whereby both traction wheels can be driven concurrently forwardly or in reverse, selectively, at infinitely variable speeds within the range of the hydraulic pumps and motors, and whereby each wheel can be reversed relative to the other for effecting short turns. The arrangement is such that reversal of a particular wheel can occur only after its speed is first gradually reduced to zero, following which its speed can be gradually increased in the reverse direction.

Various other objects and advantages will become apparent from the following description wherein reference is made to the drawings, in which.

Referring first to FIGS. 1 through 11, the truck shown for purposes of illustration is one having a combined body and chassis 1, the body including upright side plates 2 to which are integrally bonded a top plate 3, having an opening and cover 3a, and front plate 4, with intermediate upright plates 5 spaced apart from each other laterally to provide an operator's space. Mounted on the inner faces of the plates 2 are brackets 6 which support right and left-hand traction wheel assemblages 7, respectively. The body has a floor 8 of heavy plate metal on which other parts of the equipment are supported and mounted, including suitable brackets on which caster wheel assemblages 9 are mounted.

Mast pivot bearings 10 are provided at the front of the body, preferably on the transmission housing, later to be described. The pivots 10 support a mast 11 for forward and rearward rocking. Reversible hydraulic piston and cylinder assemblages 12, including a cylinder 13, piston 14, and piston rod 15, interconnect the mast 11 and the body 1, as illustrated, for rocking the mast forwardly and rearwardly.

Mounted on the mast 12 is an elevator 16 supporting usual lift forks 17 and adapted to be raised and lowered by a reversible hydraulic piston and cylinder assemblage 18. This assemblage comprises a cylinder 19 in which a piston 20 having a rod 21 is operable, such being conventional for this purpose. Between the side walls 2 is a battery compartment in which are batteries 25 for supplying power to a single electric motor 26.

The electric motor 26 has a double-end shaft to the ends of which are connected variable delivery, reversible hydraulic pumps 27, respectively. Adjacent the pumps is an oil reservoir 28 from which the pressure fluid is pumped to the driving motors and other equipment through conventional pipe lines, and to which it returns. The capacity is such that the temperature of the oil remains within a safe operating range.

Figure 1:
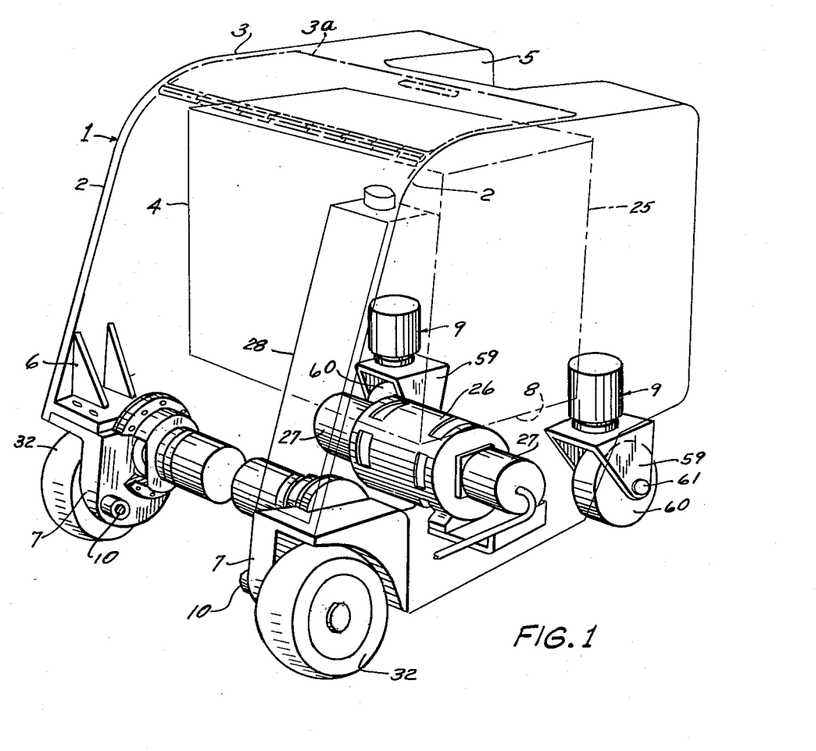
FIG. 1 is a perspective view, partly phantom, of the truck, showing relative positions of the main driving motor and its battery, the pumps and hydraulic motors, and the caster wheels.
Figure 5:
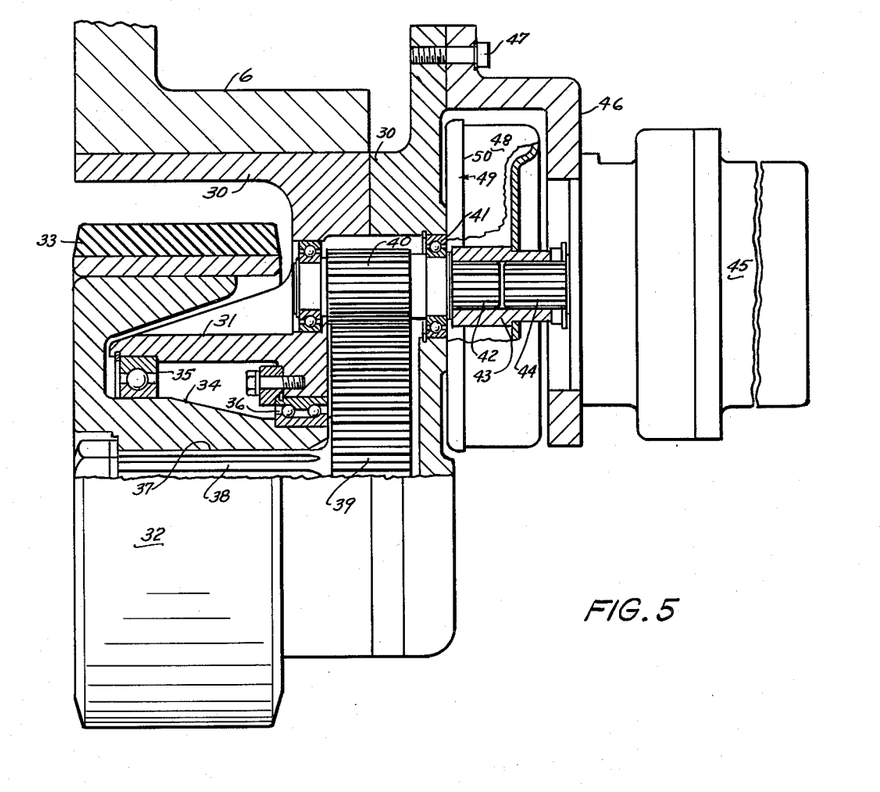
FIG. 5 is an enlarged front elevation of the one of the driving wheels at the operator's right, and its associated hydraulic motor and gear reduction mechanism, part thereof being shown in section for clearness in illustration.

Referring next to FIGS. 1 and 5, the traction wheel assemblages 7 are identical except for being arranged left and right mounting. The assemblage at the operator's right, viewed from the front of the truck, is shown in FIG. 5.

Each assemblage comprises a heavy gear transmission housing 30 which is connected to the bracket 6 with its associated wheel at the outboard side of the housing near the adjacent lateral limit of the body. Carried in the housing 30 is a hollow sleeve 31 by which a traction wheel 32 is connected to the housing. The wheel shown is one having a solid tire 33 and is made to operate on relatively smooth surfaced floors and ramps, though other types of wheels may be used.

The wheel 32 has a hub 34 which is rotatably mounted in antifriction bearings 35 and 36 in the sleeve 31 for rotation about a horizontal axis extending transversely of the truck.

The wheel has a central splined bore 37 in which a splined driving shaft 38 is secured for driving the wheel. Mounted on, and for rotation with, the shaft 38 is a driven gear 39 which, in turn, is driven by a pinion gear 40 which is rotatably mounted in suitable antifriction bearings 41 in the housing 30. The pinion gear has a splined shaft 42 which is received in an internally splined coupling sleeve 43. The coupling sleeve 43 also receives a splined shaft 44 of a hydraulic motor 45 of the type which can be driven in reverse by reversal of the supply of pressure fluid thereto.

Figure 9:
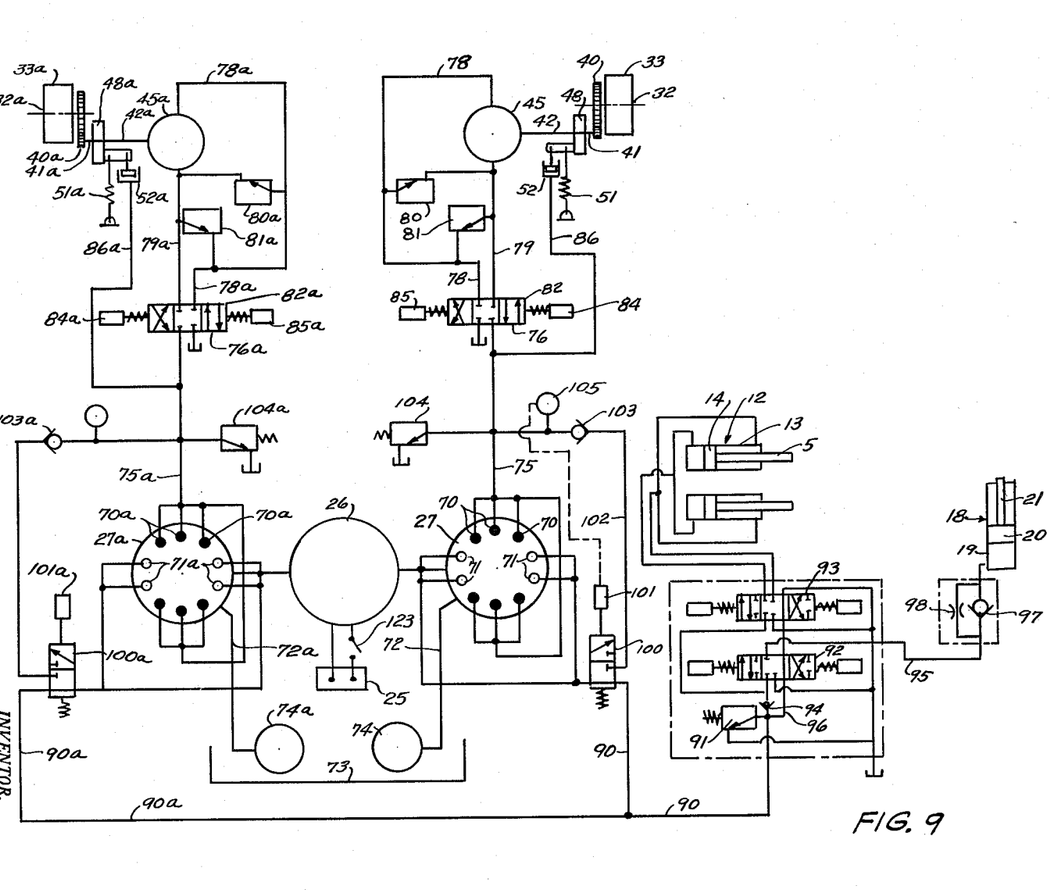
FIG. 9 is a hydraulic diagram showing the circuitry for the operation of the hydraulic driving mechanisms for the wheels, hoist, and mast.

The hydraulic motor 45 is secured in fixed position on a housing 46 which, in turn, is secured by bolts 47 to the housing 30. The sleeve 43, which is thus co-rotatable with the shafts 42 and 44, carries a brake drum 48. The housing 30, in turn, carries a stationary brake shoe mounting disc 49 on which are mounted conventional internal brake shoes 50 which cooperate with the drum 48. The specific details of the brake are relatively unimportant but, as indicated in FIG. 9, the brake is spring applied and is held released by hydraulic pressure. For this purpose, a spring 51 is arranged for applying the brake, and a piston and cylinder assemblage 52 is provided for releasing the brake when hydraulic pressure is applied to the assemblage 52.

The hydraulic motors 45 usually are of constant stroke. Their stroke may be variable for varying the speed, if they are to be used for a considerable period for one operation requiring one speed and torque range, and for another requiring a different speed and torque range. If so, their setting normally is not changed during that particular operation, the speed control being by control of the delivery of the hydraulic pumps 27. The hydraulic motors may be of a type commercially available on the market.

Figure 2:
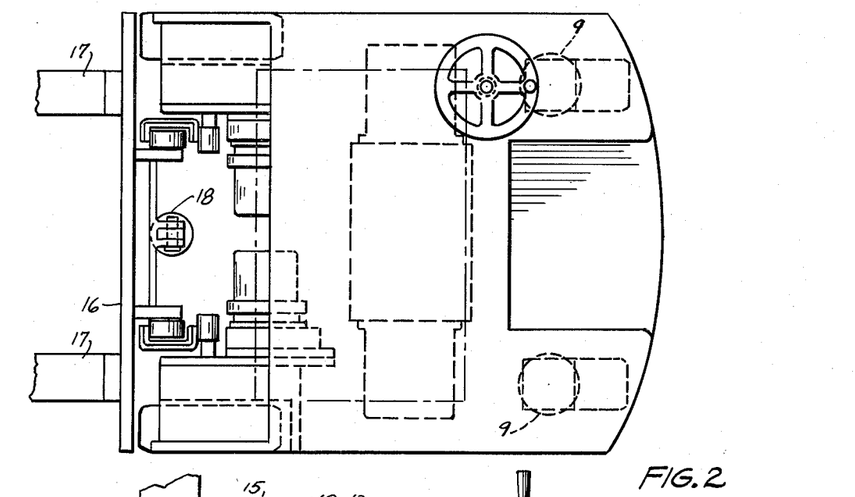
FIGS. 2 and 3 are a top plan view and a side elevation, respectively, of the truck illustrated in FIG. 1.
Figure 3:
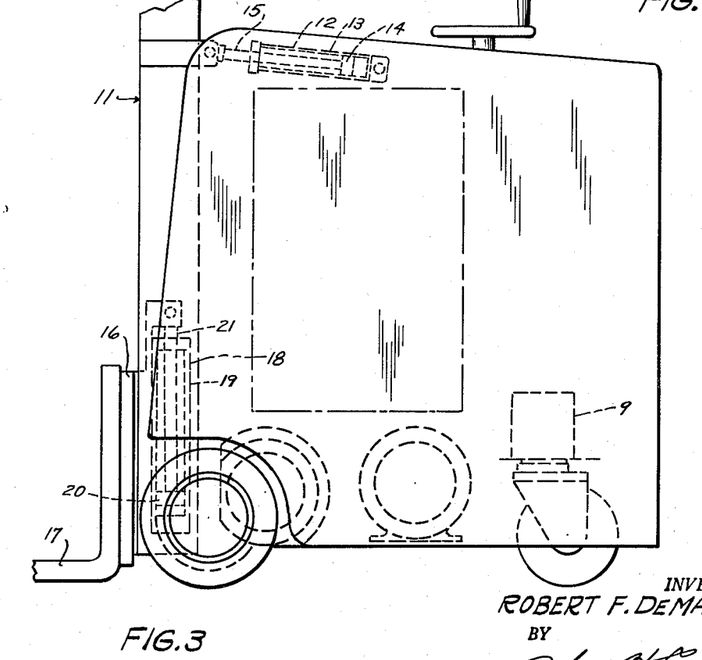
Figure 4:
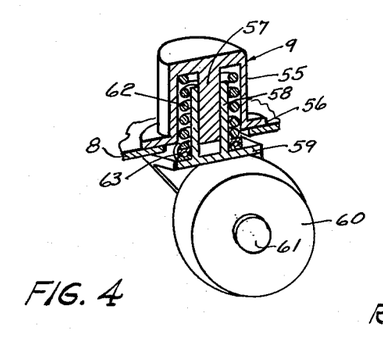
FIG. 4 is a perspective view, partly in section, of a caster wheel of the type employed in the truck.

Referring next to FIGS. 2 and 4, two caster wheel assemblages 9 are provided. Each comprises a wheel support bracket 55 which is in the form of a downwardly opening cup and provided at its lower or open end with a flange 56 by which it is bolted or otherwise secured in fixed position to the floor 8 of the truck. The support 55 has a central pivot 57 which is telescopically received in a bearing sleeve 58 on a caster wheel bracket 59. The bracket 59 supports a caster wheel 60 for rotation about a horizontal axis 61. A spring 62 is interposed between the bracket 59 and the upper end of the support bracket 55 and yieldably urges the caster wheel downwardly. If desired, anti-friction bearings 63 may be interposed between the spring and caster bracket 59.

In normal operating position, when the truck is travelling forwardly, the horizontal transverse axis 61 of the caster wheel is slightly to the rear of the upright axis of the pivot 57. Thus, the forward driving forces tend to swing the caster wheels into parallelism with the driving wheels. Since the offset of the axis 61 from the pivot 57 is relatively short, the caster wheels tend to track without objectional lateral rocking about the axis of the pivot 57. Means providing frictional forces yieldably resisting or snubbing the rocking of the caster wheel may be used, if desired, but they must be such as to permit the caster wheels to rock through all angles in each direction about the pivot 57.

It is seen from the description that, if the wheels 32 are driven forwardly at the same speed, the truck will proceed in a lineal forward path, the caster wheels 60 aligning themselves for this purpose. If both wheels 32 are reversed and driven at the same speed, the caster wheels reverse so as to dispose their axes 61 at the side of the axis of the pivot 57 which is nearest the wheels 32, and then thereafter align themselves. On the other hand, if either wheel 32 is driven faster than the other, the truck turns about a center at the outboard side of the truck adjacent the slower moving wheel. If one wheel 32 stops and the other turns, then the truck pivots about the stopped wheel. If one wheel is driven forward and the other reversed, then the truck pivots about a point inboard of the wheels 32. With the wheels 32 rotating in opposite directions at the same speed of rotation, the shortest turning radius is obtained, and therein the caster wheels are rolling substantially transversely of the truck body.

Referring next to FIG. 9, each of the pumps 27 is a multi-port pump and since each is the same in form and function, in the circuit illustrated, only one hydraulic pump and motor and its circuitry is described in detail, the other being referred to by like numerals with the suffix "a."

The particular pump 27 shown is a variable delivery, unidirectional pump, though for some uses a reversible pump may be employed and corresponding reversible control valves eliminated. It is one that is available commercially on the market and includes a set of pressure ports 70 which are connected in parallel with each other, and a set of pressure ports 71 which are connected in parallel with each other.

It has an intake connected by a line 72 to a suitable sump 73 from which the oil is withdrawn through a strainer 74. The parallel connected ports 70 deliver pressure to the main pressure line 75 which leads to a solenoid operated reversible directional valve 76. Overload relief valves 80 and 81 are provided for relieving excessive pressures built up in the lines 78 and 79, respectively, due to dynamic inertia of the travelling loaded truck. The lines 78 and 79 are connected to the motor 45. The valve 76 is arranged so that in its normal intermediate position, as illustrated in FIG. 9, it blocks the lines 75, 77, 78 and 79. The valve plug 82 is spring returned to this position. It is driven by solenoids 84 and 85 so arranged that when the solenoid 84 is energized, it shifts the valve to a position for driving the motor 45 forward. When the solenoid 85 is energized, it shifts the valve for driving the motor in reverse.

A line 86 connects the cylinder 52 to the line 75 at a location between the pump 27 and the valve 76 so that, so long as the electric motor 26 is operating the pump 27, the brake will be held in released condition.

Here it is to be noted that the minimum operating pressure utilized for the present truck is in the neighborhood of 300 to 500 pounds per square inch. However, the hydraulic pressure of as little as 100 pounds per square inch is sufficient to maintain the brake released, wherefore the brake always is released before appreciable torque is applied by the motor 45. This provides automatic service, parking, and "dead man" braking.

The ports 71 of the pump 27 are connected to a line 90 which supplies pressure fluid to the hoist through a control mechanism which forms no part of the invention and hence is described only briefly. An overload relief valve 91 is connected to the pressure line 90. The line 90 is connected to a manual control valve 92 which controls the piston and hoist cylinder assemblage 18, and a manual control valve 93 which controls the mast tilt piston and cylinder assemblage 12. A check valve 94 is provided in the line 90 in advance of the valves 92 and 93. The valve 92 is arranged in a normal intermediate position in which it blocks the flow of pressure fluid from the line 90 to a line 95 which leads to the head end of the hoist assemblage 18 and bypasses pressure fluid through the line 96 to the valve 93. In another position, it blocks the line 96 and supplies pressure fluid from the line 90 through the check valve 94 to the head end of the cylinder 18. In the third position, it blocks the line 96 and vents the line 95 to the sump.

Interposed in the line 95 is a check valve 97 which opens in a direction for supplying pressure fluid to the assemblage 18, and closes in the opposite direction. A throttle 98 is also provided for throttling the return of pressure fluid from the assemblage 18 under the weight of the load on the hoist. The valve 93 is arranged to bypass pressure fluid to the sump or to deliver it to opposite ends of the assemblages 12, selectively, so as to rock or tilt the mast forwardly and rearwardly.

In some cases, it is desired that the pressure fluid used for hoists and tilting cylinders be used for driving the wheels 32, thus providing an overdrive. For such purposes, the line 90 has connected therein a solenoid operated diversion valve 100 which is operable by a solenoid 101. In the normal setting of this valve, all the discharge of pressure fluid from the ports 71 of the pump 27 issues through the line 90 to the control valves 92 and 93, above described. Energization of the solenoid 101 sets the valve to block the flow to the valve 92 and transfer the flow from the ports 71 to the line 102. The line 102 is connected to the line 75 through a check valve 103. A pressure relief valve 104 is provided for relieving excessive pressure in the line 75. The check valve 103 operates to permit the flow of pressure fluid to the line 75, but prevent its return.

A pressure switch 105, adjacent the check valve 103 is electrically connected to the solenoid 101 so that, should the line pressure reach an amount which would overload the electric motor, the switch will de-energize the solenoid 101, thus eliminating the overdrive. This prevents excessive electric motor overloads during ramp work.

The pump 27a and its circuitry are identical with the pump 27 and its circuitry, and the line 90a to the pump 27a is connected in parallel with the line 90.

For steering the truck by controlling the delivery of the pumps 27 and 27a to to the hydraulic motors of the wheels 32 and 32a, respectively, flexible cables 110 and 110a are provided for operating the built-in variable delivery control mechanism of the pumps. These cables and the built-in variable delivery control mechanisms provide settable means for preselecting the pressure fluid delivery of the pumps. Since these cables operated in essentially the same manner, the mechanisms for operating them will be described as applied only to the cable 110, the corresponding operating mechanism for the cable 110a being designated by corresponding numerals with the suffix "a."

The cable 110 is connected to a movable member which is shown as a slide 111 which operates in a vertical slideway 112 of a horizontally adjustable slide arm 113. The slide 111 has a follower 114 which is slidable in a slot 115 in a link 116. The link 116 is pivotally connected by a pivot 117 to a support 118 which is rigid with the body of the truck. This connection provides operating means for the slides 111 is the form of a scotch yoke arrangement such that, upon rocking of the link 116 about the pivot 117, the slide 111 is moved upwardly and downwardly in the slot 112. Due to the cooperation of the follower 114 with the slot 115, movement of the arm 113 endwise causes the slide 111 to rise and fall in the slideway 112. The slot 115 does not extend entirely through the link 116 and hence extends past the pivot 117 so that the follower 114 can be moved to a position coaxial with the pivot 117. The arm 113 is mounted in a slideway 119 in the support 118 for endwise sliding movement. Sliding the slide arm 113 endwise forwardly of the truck or to the left in FIG. 6, lowers the slides 111 and 111a to reduce the delivery of the pumps 27 and 27a and thereby the speed of both wheels 32 and 32a of the truck. Moving of the slide arm rearwardly, or to the right, raises the slides 111 and 111a and increases the delivery of the pumps and thereby the speed of both wheels.

At its forward end, the arm 113 is pivotally connected to a link 120 which, in turn, is pivotally connected to the lower end of the speed control lever 121. The lever 121 is arranged so that upon forward movement of its upper end, it moves the arm 113 to the right and thereby increases the delivery of the pump. Upon its movement in the opposite direction, it decreases the delivery—to zero, if desired. The link 120 carries a cam 122 which, when the lever is moved out of stop position, closes a normally open switch 123 to start the motor 26.

It is desired to use the hydraulic motors for steering. For this purpose, a steering wheel 125 is rotatably mounted in a suitable bracket 126 on the frame of the truck. The wheel 125 drives a screw 127. A follower 128 is mounted in a slideway 129 which is in fixed relation to the bracket 126. The slideway guides the follower 128 for vertical movement in a lineal path. The follower is connected to the screw for lifting and lowering thereby upon the rotation of the screw 127 by the steering wheel 125 in opposite directions, respectively.

In the form illustrated, the follower is arranged to be driven downwardly upon rotation of the wheel 125 clockwise for making a right turn, and to rise when the wheel 125 is driven counterclockwise for making a left turn. The follower 128 is connected by a flexible cable 130 to a pivoted operating lever 131 having a pivot 131b. The lever has a came slot 132 with a peak 133 and a portion 134 having a constant radius from the pivot 131b.

The follower 128 is driven downwardly by rotating the steering wheel 125 clockwise and thereupon rocks the lever 131 and the cam slot 132 counterclockwise about the pivot 131b of the lever. The link 116 has a cam roller 136 operating in the cam slot 132.

Figures 6, 7, 8:
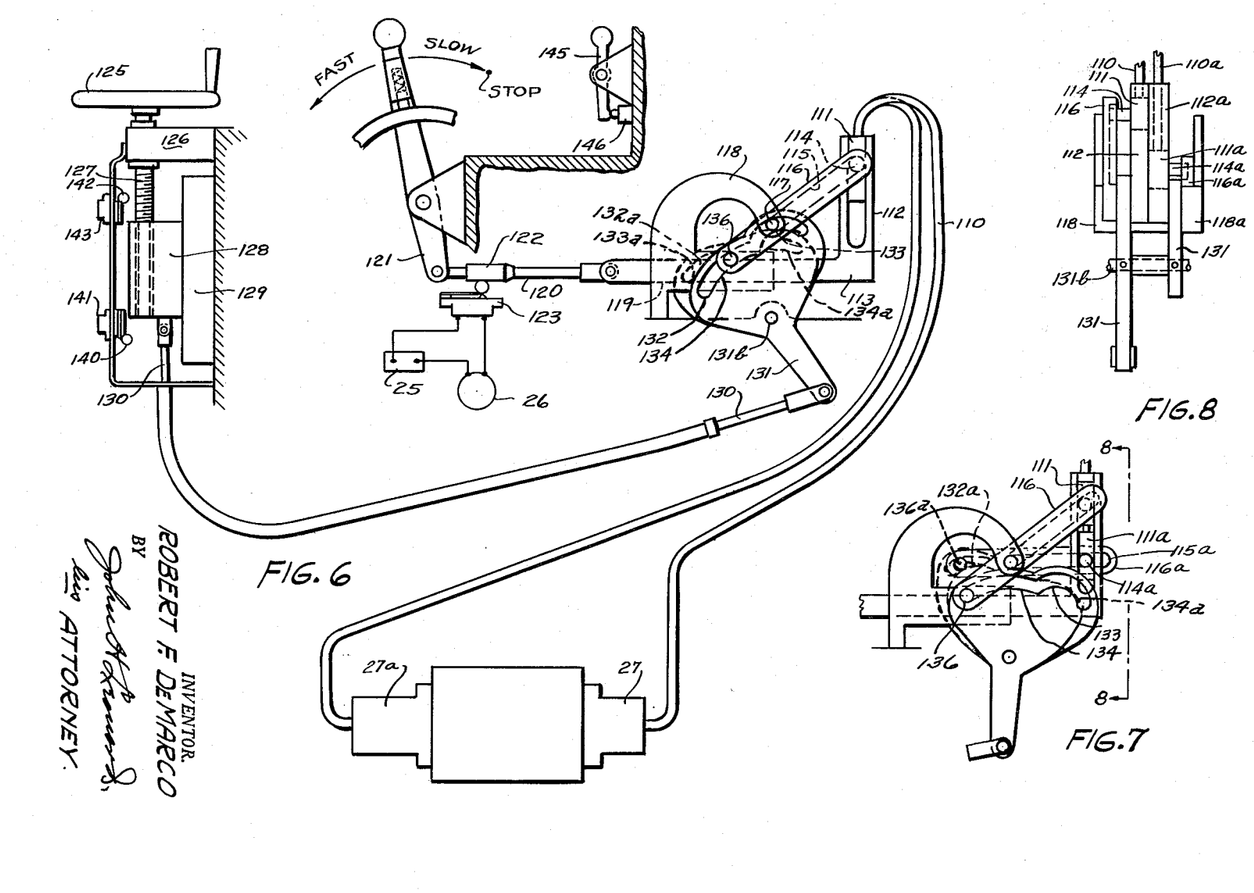
FIG. 6 is a somewhat diagrammatic side elevation showing the steering and speed control mechanism for the truck illustrated in FIGS. 1 through 5.
FIG. 7 is a fragmentary view of a portion of the steering control mechanism illustrated in FIG. 6, showing a different operating position thereof.
FIG. 8 is a fragmentary end elevation of the structure illustrated in FIG. 7, as viewed from the line 8—8 in FIG. 7.

In the form shown in FIG. 6, the rollers 136 and 136a are in the constant radius portion 134 of the cam slots 132 and 132a, respectively, in which case the slides 111 and 111a are in their highest positions. In these positions, both pumps are operating at the same maximum permitted by the setting of the slide arm 113. The cam slots 132 and 132a are oppositely arranged with respect to each other so that the peak 133 of slot 132 is opposite the constant diameter portion 134a of slot 132a and the peak 133a of the slot 132a is opposite the constant radius portion 134 of the slot 132. By moving the arm 113 to the left, the slides 111 and 111a are moved downwardly by engagement of the followers 114 and 114a with the slots 115 and 115a. However, for guiding, it is necessary to shift one of the slides 111 and 111a relative to the other. By moving the follower 128 downwardly by rotating the wheel 125 clockwise, the lever 131 is swung counterclockwise about its pivot 131b. This movement causes the cam slot 132 to present its peak 133 to the roller 136, thus swinging the link 116 clockwise about its pivot 117 and gradually reducing the speed of the right wheel to zero. Meanwhile, the speed of the left wheel continues as its roller 136a is resting on the constant radius part 134a of the cam slot 132a. Since the bottom of the slot 112 is in a horizontal plane through the pivot 117, movement of the arm 113 does not move the slide 111 out of zero position. Meanwhile, there is no change in the position of the link 116a which controls the left wheel. Thus the right-hand pump has had its stroke reduced to, and it remains at, zero. Since, in this position the link 116 is horizontal and therefore is not affected by movement of the arm 113 to right or left, as the follower 114 can be slid only substantially in the plane of the slot 115 by the lever 121, the control of the speed of turning, the right wheel remaining stationary, is controlled by the swinging of the lever 121 which controls the speed of the left wheel. When the slide 128 has been moved downwardly so that the link 116 is horizontal and the pump 27 is at zero stroke so that the right wheel is stationary, the slide 128 strikes a roller 140 on a limit switch 141. The limit switch 141, when operated, operates the reversing valve 76 for reversing the delivery of pressure fluid to the right-hand motor 45 while the stroke of the pump is at zero. While the slide is within the range and operating the limit switch 101, the right-hand motor is therefore driven in reverse and its speed in reverse is controlled by the peak 133 of the cam slot 132. Continued downward movement of the follower 128 while the limit switch is in reverse causes the roller 136 to ride down the right-hand edge of the peak 133, thus again increasing the speed in reverse.

As mentioned, the limit switch 141 is such that it is not operated until the speed of the right-hand motor has been reduced to zero by stopping the delivery of the pump. After it reverses, then the speed can be increased in the opposite direction.

The opposite link 116a, cam slot 132a, and follower 114a operate for the left pump 27a in exactly the reverse order, functioning with respect to the wheel motor when the lever 131 is rocked clockwise. When turning to the left, the wheel 125 is spun counterclockwise which causes the follower 128 to rise, thus repeating the operation in the reverse direction until it strikes the roller 142 of a limit switch 143. At this position, the stroke of the pump 27a is at zero, and the switch 143 operates to reverse the direction of flow to the left-hand motor 45a while its pump is at zero stroke. Upon continued rise of the follower 128, the cam peak 133a allows the link 116a to swing downwardly to the right about its pivotal axis 117a and thereby increase the flow of pressure fluid to the left-hand motor 45a in the reverse direction.

Shutting off the pump delivery of either pump by virtue of the lever 121 or lever 131 sets the brake for the associated wheel by stopping the flow of pressure thereto.

However, the valve 76, when in a neutral position with neither solenoid 84 or 85 energized, as when the power is turned off, returns to a neutral position and blocks all lines to the motor 45 and the system is hydraulically locked. In use, one or both of the solenoids of the valves 76 and 76a is always operating.

In addition to the lever 121, a reversing lever 145 is pivotally mounted on the frame adjacent the lever 121. This lever is arranged to operate a directional selector switch 146 for the motor 26.

When one wheel is reversed, relative to the other, the caster wheels 60 assume a position for rolling transversely of the length of the truck.

Figure 10:
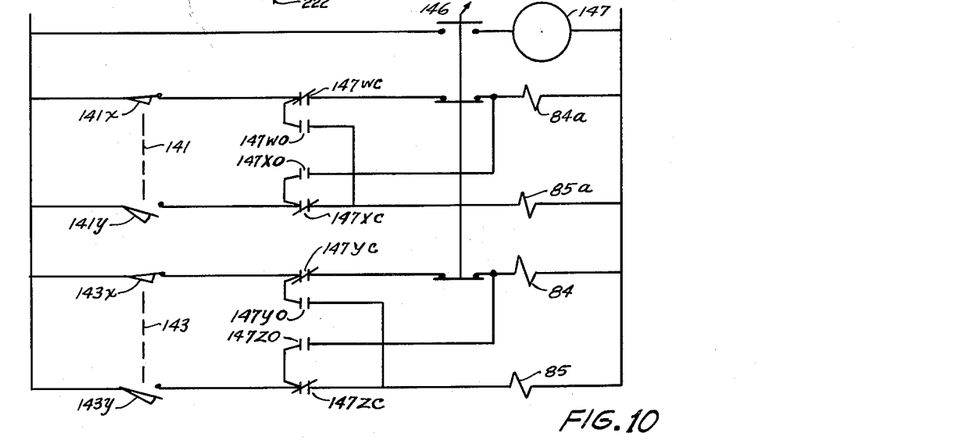
FIG. 10 is a wiring diagram showing the control thereof.
Figure 11:
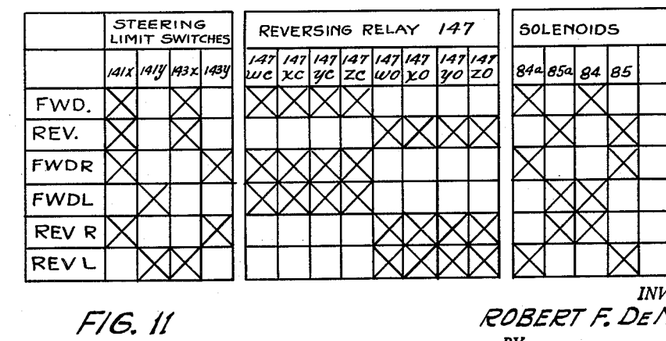
FIG. 11 is a table showing the control settings for various driving effects obtainable by the structures of the diagrams of FIGS. 9 and 10.

Referring to FIGS. 10 and 11, the limit switch 141 has contacts 141x and 141y. The limit switch 143 has contacts 143x and 143y. Contact 141x is normally closed and 141y normally open. They are arranged to reverse upon operation of the switch. Contact 143x is normally closed and 143y open and they too are arranged to reverse upon operation of the switch 143. Assume that the slide 128 is in neutral position and out of contact with either switch 141 or 143, and that the switch 146 has been set, as illustrated in FIG. 10, for forward movement, the contacts of a control relay 147 are set, as illustrated. Thus, through switch contact 141x and normally closed relay contacts 147wc, solenoid 84a is operable. Through contact 143x and normally closed relay contact 147yc, solenoid 84 is operable. This setting causes both driving wheels to rotate for forward drive. With the steering mechanism, if limit switch 141 is tripped, 141x is open and 141y closed, whereupon solenoid 85a is operated to reverse the left drive wheel through switch 141y and the normally closed relay contact 147xc which is normally closed, at the same time de-energizing solenoid 84a. Correspondingly, if limit switch 143 is tripped, 143x opens to de-energize solenoid 84 and 143y closes to energize solenoid 85 through the normally closed relay contact 147zc, thus reversing the right front wheel.

Upon closing of the reverse switch 146, this arrangement is reversed. In the reversed condition, with the relays 141x and 143x closed, solenoid 85a is energized through the now closed contact 141xo and the solenoid 85 is rendered operative through a now normally closed contact 147yo. Upon tripping the limit switch 141, the normally open contact 147xo is closed and solenoid 84a is energized by the closure of 141y. Likewise, if limit switch 143 is closed, the normally open contact 147zo is closed and the solenoid 84 is energized through the closure of contact 143y. Thus, the same operation of the motors with respect to each other can be obtained but in the reverse directions, all as illustrated in FIG. 11.

The form of truck above described can operate and maneuver in much more closely confined spaces and aisles than trucks heretofore provided. For example, the working aisle required for maneuvering a two-ton counterbalanced truck of the present design is less than that required for maneuvering one-ton counterbalanced lift trucks of prior designs.

Figure 12:
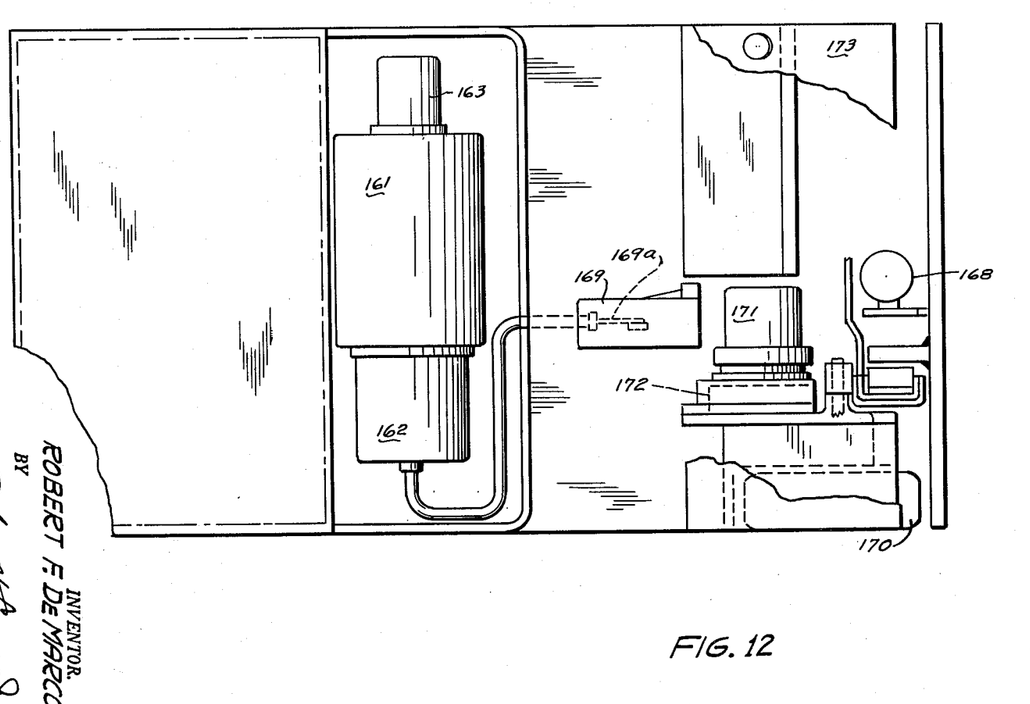
FIGS. 12 and 13 are a top plan view and a side elevation, respectively, of a modified form of truck embodying the principles of the present invention.
Figure 13:
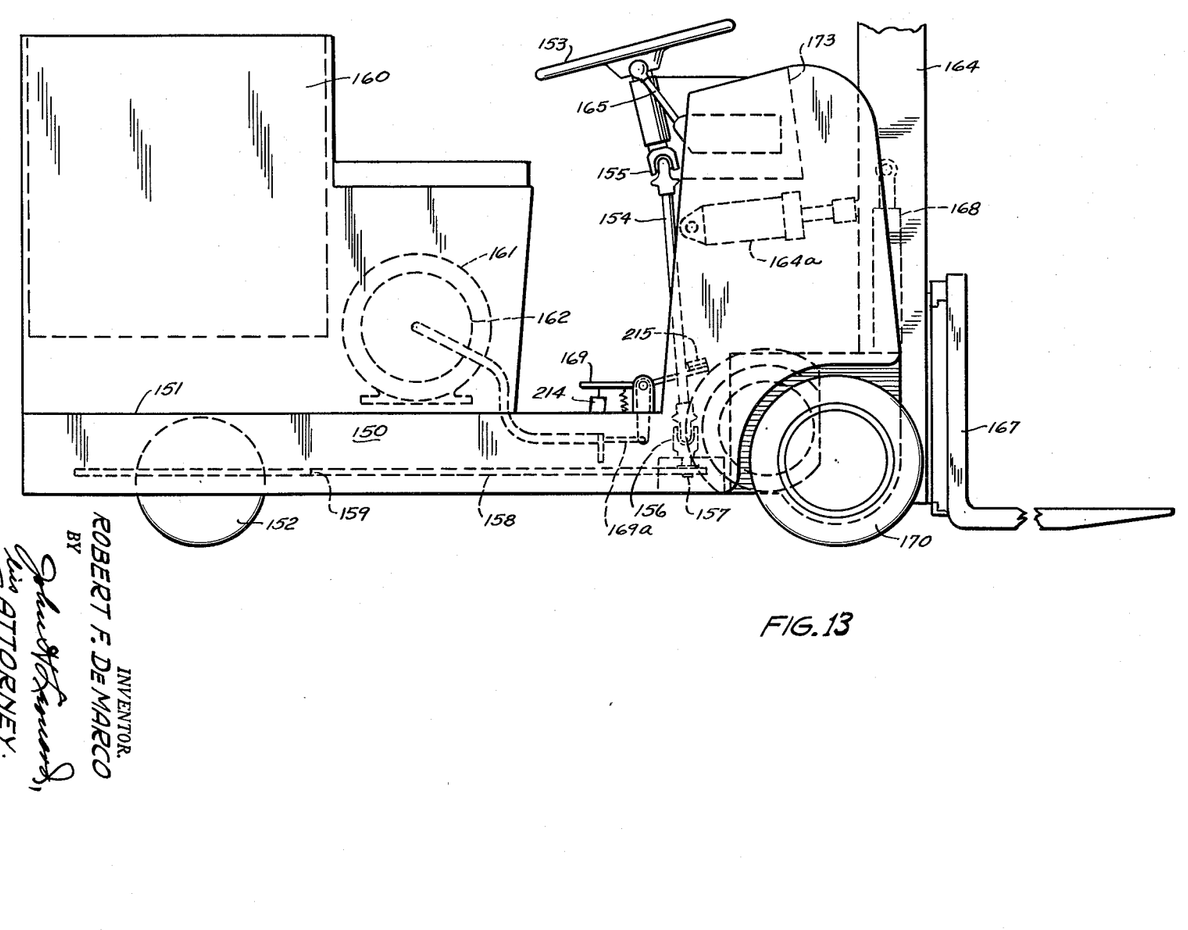

Referring next to FIGS. 12 and 13, a modified form of the drive is provided. The truck therein shown comprises a chassis frame 150 having a floor 151 on which is provided a pair of dirigible rear wheels 152 of the general type described in the copending application of Robert F. De Marco and Henry W. Hein, Serial No. 107,492, filed May 3, 1961. These wheels are steerable through a steering wheel 153 which is connected by a shaft 154 with universal joints 155 and 156 to a sprocket 157. A chain 158 leads from the sprocket to a sprocket 159 on the dirigible wheel assemblage. The chassis carry the battery compartment 160 and electric motor 161 having at one end a traction service pump 162 and at the other end a lift pump 163. The truck has the conventional pivoted mast 164 which can be tilted by virtue of a piston and cylinder assemblage 164a controlled by a lever 165 and accompanying valve 166. A conventional fork elevator lift 167 is slidably mounted on the mast 164 and is raised and lowered by means of a suitable piston and cylinder assemblage 168, the hoist mechanism being conventional.

The delivery of the pump 162 is controlled by a foot pedal 169 by means of a flexible cable 169a so that the delivery can be increased or decreased by rocking the pedal. In this form, it is to be noted that a single motor is used which permits reduction in total motor equipmnet. Due to the greater efficiency of a single motor as compared to a plurality of motors, there is a reduction in the battery capacity required, thus contributing to the reduced size and greater carrying capacity and shorter turning radius as hereinbefore described. However, in this structure, the steering is by virtue of the steering wheel. On the other hand, the truck can be considerably shortened because no differentials for the driving wheels are required. The driving wheels 170 are equipped with their individual hydraulic motors 171 and brakes 172 both for servicing and parking. A reservoir 173 is provided alongside the motors for the hydraulic fluid.

Figure 14:
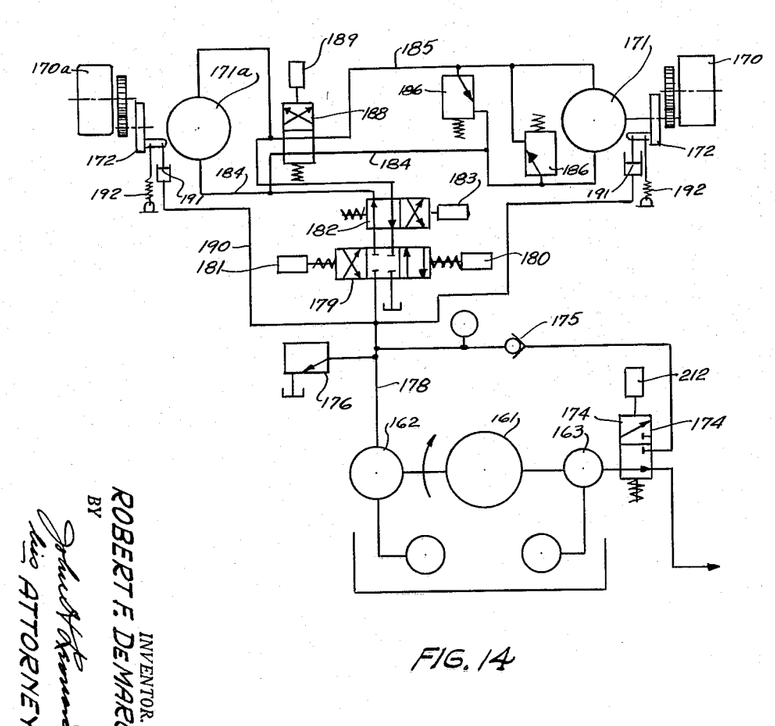
FIG. 14 is a hydraulic diagram for one modified form of the invention which may be used in connection with FIGS. 12 and 13.
Figure 15:
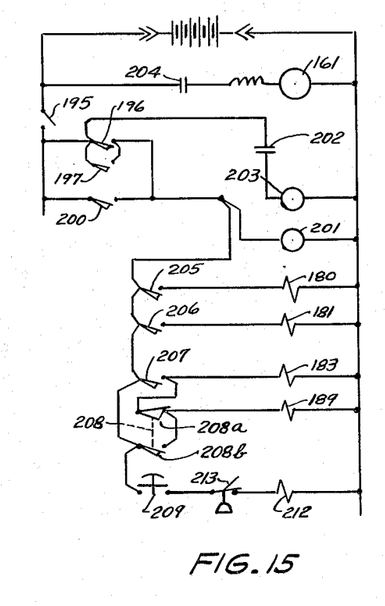
FIG. 15 is a wiring diagram for the circuit illustrated in FIG. 14.
Figure 16:
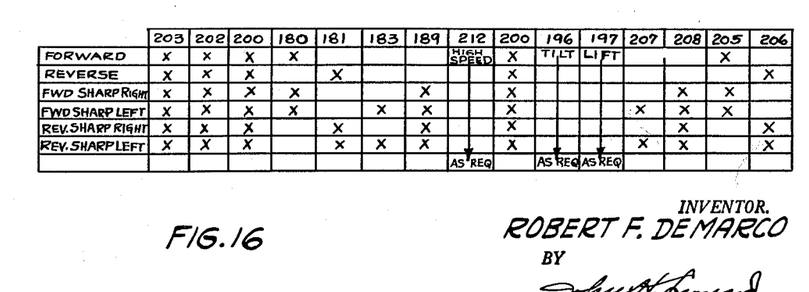
FIG. 16 is a table showing the control settings for various driving effects obtainable by the structures of FIGS. 14 and 15.

As best illustrated in FIGS. 14 through 16, the right driving wheel is designated 170 and the left wheel 170a. The specific controls and brakes and like for each wheel are designated by the same numerals with the prefix "a" for the left mechanism. Further, it is pointed out that a solenoid operated valve 174 is provided for connecting the pump 163 to the conventional lift-tilt and accessory circuit and disconnecting it therefrom, if desired, and for connecting it in parallel with the pressure delivery side of the pump 162 for overdrive of the wheels 170 and 170a, are required. For this purpose, a check valve 175 and overload relief valve 176 are interposed in the line. The pump 162 delivers fluid pressure through line 178 to the control valve 179. It is operable for stopping delivery to both motors 171 and 171a, for admitting flow to both, and for reversing the flow thereto. The valve 179 is controlled by solenoids 180 and 181. It is connected, in turn, to a valve 182 controlled by a solenoid 183. The motors are connected in parallel through a line 184 at one side and through the line 185 at the opposite side. Conventional overload pressure relief valves 186 interconnect these lines so as to relieve the lines and motors from excessive pressures due to inertia of the traveling load.

Interposed in the lines 184 and 185 is a solenoid operated valve 188 operated by a solenoid 189, the valves 179, 182 and 188 being arranged for controlling the drives of the motors, as will later be explained. Line 190 is interposed in the line 178 between the variable delivery pump 162 and the valve 179 and is connected to the brakes 172 which, as heretofore explained in connection with FIGS. 1 through 11, are spring applied pressure released brakes. With this arrangement, as soon as pressure fluid is supplied in the line 178, it operates pistons 191 for releasing the springs 192 at a pressure below that which is necessary to drive the motors 171 and 171a.

This brake arrangement thus provides a form of coordinating devices, arranged one for each wheel, and each operative to constrain its associated wheel from over-running relation to the pressure fluid delivery to it by the pump. For example, should wheel 170 start to overrun, its hydraulic motor would function as a pump and greatly reduce the pressure in the line 190. Any decrease, below normal, in the pressure supplied to the piston 191 causes the spring 192 to apply the brake, the degree of application being inversely proportional to the pressure supplied to the piston.

Conventional throttle valve means may be so connected to the motor as to be responsive to over-running of the motor to reduce its speed to that intended by the pump delivery. However, such is not as desirable as the presenting braking system, as throttling of the pressure fluid tends to heat it unduly.

It is apparent that with this arrangement, by setting the valve 179, both motors can be driven forward, both can be driven in reverse, or both can be hydraulically locked. Assuming that pressure fluid is being supplied to the valve 179 to drive the motors, for example, in the forward direction, then the valve 182 can be operated to reverse the flow independently of valve 179. The delivery from the valve 182 can be reversed as to motor 171 only by the valve 188. With this combination, both motors can be driven forwardly, both reversed, or either reversed while the other is driven forwardly in accordance with the settings illustrated in FIG. 16. Thus, assuming the valve 179 is operated by a solenoid 180 for direct drive forward of both wheels, and the valve 182 is in the position illustrated, both wheels drive forwardly. If, while driving forward, it is desired to reverse the wheel 170 without reversing the wheel 170a, the valve 188 is operated by the solenoid 189. On the other hand, if it is desired to drive 170a in reverse, the valve 182 is reversed which would normally reverse both wheels, but the valve 188 is concurrently operated so that the motor 171 is again restored to forward movement, but the motor 171a is in reverse. For operating the circuit, a normal key operated switch 195 is provided. In addition thereto, there is a lift switch 196 and a tilt switch 197 for operating the hoist and for tilting of the mast, respectively. A switch 200 which is operated by the pedal 169 is provided. These switches 196, 197 and 200 are connected in parallel and their parallel connection is connected in series with a relay 201 which is an instant-closure, time-opening relay. Closure of any one of the switches energizes the relay to close its normally open contacts 202, thereby energizing relay coil 203 which closes normally open contacts 204 to start the motor 161. The solenoid 180 is controlled by normally open limit switch 205 and solenoid 181 by the normally open limit switch 206; solenoid 183 by normally open limit switch 207; solenoid 189 by a normally closed limit switch 208 having contacts 208a and 208b. A bush button switch 209 operates the solenoid 212 and is useful when overdrive is required. A pressure switch 213 is provided for relieving the system if excessive pressure occurs for any reason. The treadle 169, when depressed for advancing forwardly, closes the switch 200 thereby energizing the motor 161. Further depression operates limit switch 205 to energize solenoid 180 and thereby cause delivery of pressure fluid to the motors 171 and 171a for forward movement. This accelerator is also connected to the delivery control of the variable delivery pump by the cable 169a so as to control the pressure fluid delivered to the motors 171 and 171a, immediately after solenoid 180 or 181 is energized, and thereby thus control the speed. When released, the treadle is spring returned to neutral position, whereupon delivery of the pump is reduced to substantially zero and the valve 213 opened, thereby blocking the flow of pressure fluid to the driving wheels. In order to prevent too rapid acceleration and deceleration, suitable means are provided. In the form illustrated, the means comprise a double-acting dash pot 214, operatively connected to the treadle 169.

Mounted on the treadle 169 is a reversing treadle 215. This treadle 215 is so arranged that it can be pushed down prior to the treadle 169 and when the treadle 215 reaches the level of the forward portion of the treadle 169, the two treadles continue moving together under the influence of the operator's foot. When the treadle 215 is first pushed down, it operates a limit switch 206 which energizes solenoid 181 and thus reverses valve 179 so as to reverse both motors. Continued movement of both pedals downwardly accelerates the drive in reverse. A suitable interlock mechanism of any conventional type is provided so that, in event during quick change from full forward to reverse, the foot slips off of the reversing pedal 215 while the pedal 169 is depressed, the reverse pedal 215 will not suddenly become inoperative, but will remain interlocked and depressed until the treadle 169 is returned to neutral. In addition to the conventional steering, limit switches 207 and 208 may be arranged for operation by the steering mechanisms so that, when the driving wheels are turned to the extreme position for a left turn, either forward or reverse, the limit switch 207 is closed and the limit switch 208 operates so that its contact 208a is open and its contact 208b is closed. For a sharp right turn, limit switch 207 is open and the limit switch 208 is operated so that its contact 208a is closed and its contact 208b open, both in forward and reverse. The various operations which can be obtained are set forth in table FIG. 16. It is apparent that this form of the invention has the advantage of a compact pump and motor arrangement with conventional steering which can be supplemented by hydraulic motor steering by the driving wheels, when needed. For example, sometimes the dirigible wheels are turned so that their axes approach a position normal to the axis of the driving wheels. In this position, they cease to steer and tend to skid sideways. In such instances, the hydraulic circuit is operated to assist in turning the truck in the direction in which the dirigible wheels are directed. The circuit also provides a speed differential for the motors 171 and 171a, thus making it possible to eliminate the conventional differential which would make it necessary to increase the length of the truck. At the same time, dynamic braking and hydraulic locking can be utilized, as a result of which the brakes are not subjected to appreciable wear.

Figure 17:
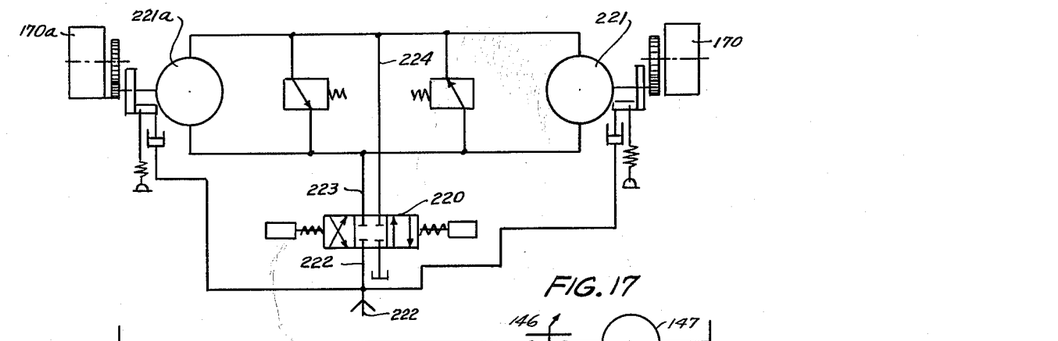
FIG. 17 is a wiring diagram for a second modification of the structure illustrated in FIGS. 12 and 13.

Referring next to the next modification which is illustrated in FIG. 17, the structure may be essentially that shown in FIG. 14, except for the different circuitry involved. The circuitry shown in FIG. 17 does not have the flexibility of the previous structures in that it does not have an arrangement for reversing both wheels. In other respects, it is the same as the structure illustrated in FIG. 14. The fluid supply through the main control valve and brakes is the same as in FIG. 14. However, the valve 220 which corresponds to the valve 179 is the only control valve. This valve is operable to deliver pressure fluid to the motors 221 and 221a so that both are driven forwardly, both are reversed, or both are locked hydraulically. Pressure is supplied to the valve through a line 222 and ports of the valve connected to lines 223 and 224, respectively. Line 223 connects the one side of the motors in parallel and the line 224 connects the other side of the motors in parallel. Thus, the motors operate with hydraulic differential due to their parallel connection so that space losses resulting therefrom are eliminated. In this form, as mentioned, the motors 221 and 221a operate in reverse and forward together and always at the same speed with each other, all steering being done by means of the dirigible wheels operated by the conventional steering wheel.

It is apparent from the foregoing description that by virtue of the use of dual hydraulic motors on the wheels and a single motor for driving the pump, many advantages both as to the size and maneuverability of the truck can be obtained. If more flexibility is required for the motors on the driving wheels, the motors may be of a type which are adjustable for variable speeds. However, speed adjustment during operation generally is not required as it is obtained by the setting of the pump, or pumps. The motors, once set, are continued at the same setting for general use. For example, a higher speed than is customarily obtained may be desired in case of a light load and a long haul, in which case the motors would be adjusted for operating at a higher speed for a given delivery of the pump. On the other hand, the work may be for very heavy loads of slight grades requiring extremely low speeds which could be obtained by setting the reactances of the pumps so that with a full flow of power from the pump, the motors will operate at very slow speed, thus obtaining great mechanical advantages. In general, however, the normal use of such trucks at any given site is such that variable speed motors usually are not desired, the speed reached being obtained by variations in the delivery of the pump.

The truck does not require expensive and large scale explosion proof housings, but only a single power switch and motor and a few small control switches, each of which can readily be housed in its own explosion proof housing. Hence it is particularly desirable for use at sites where explosion hazards are pronounced, such as in ship holds, mines, powder plants, refining plants, and the like.

Various types of electric motors may be used, but a constant speed motor, preferably a series wound motor, or a series-compound wound motor is employed for highest efficiency.

Having thus described my invention, I claim:

1. An industrial truck comprising a chassis, a pair of driving wheels, hydraulic motors drivingly connected to the wheels, respectively, variable delivery pump means, direct current electric motor means drivingly connected to the pump means, hydraulic circuit means connecting the pump means to the hydraulic motors, control means operable by an operator of the truck for adjusting the delivery of the pump means thereby to control the volume of flow of pressure fluid to the hydraulic motors, said hydraulic circuit means being operative at all times during operation of the pump means and motor means to conduct freely to the hydraulic motors substantially all of the fluid delivered by the pump means, reversing valve means in the hydraulic circuit means between the pump means and the hydraulic motors, a battery carried on the chassis, and an external electric circuit, which is substantially free from motor control resistance under all operating conditions of the electric motor means, connecting the battery to the electric motor means, and said electric motor means having a field winding and an armature winding in series therewith.

2. An industrial truck according to claim 1 wherein the pump means are unidirectional in delivery and the hydraulic circuit means are of the open circuit type.

3. An industrial truck according to claim 1 wherein the pump means are separate and independent pumps connected to the electric motor means for rotation in fixed relation to each other, and the hydraulic circuit means are two independent circuits, one of which connects one pump to one of the hydraulic motors and the other of which connects the other of the pumps to the other of the hydraulic motors.

4. An industrial truck according to claim 3 wherein coordinating devices are provided for the wheels, respectively, and each is operative in response to hydraulic pressure in the circuit to the hydraulic motor of its associated wheel, to constrain the hydraulic motor of its associated wheel from overrunning relation to the hydraulic pressure delivered by the associated pump.

5. An industrial truck according to claim 3 wherein the reversing valve means are directional valves in the circuits, respectively, and are operable independently of each other for reversing each hydraulic motor independently of the other.

6. An industrial truck including a chassis, a pair of driving wheels, hydraulic motors drivingly connected to the wheels, respectively, a unidirectional variable delivery pump, a single unidirectional direct current electric motor drivingly connected to the pump, a battery on the chassis, an external electric circuit, which is substantially free from motor control resistance under all operating conditions of the electric motor, connecting the battery to the electric motor for energizing the motor, an open type hydraulic circuit connecting the hydraulic motors to the pump in parallel relation with each other, reversing valve means connected in the hydraulic circuit between the pump and hydraulic motors for reversing the delivery to both hydraulic motors, concurrently, the pressure fluid of the pump, control means operable by an operator of the truck for adjusting the delivery of the pump thereby to control the volume of flow of pressure fluid to the hydraulic motors, said hydraulic circuit being operative at all times during operation of the pump and motors to conduct freely to the hydraulic motors substantially all of the fluid delivered by the pump, dirigible wheel means on the chassis, steering wheel means accessible to the operator to turn the dirigible wheel means.

7. An industrial truck according to claim 6 wherein coordinating devices are provided for the wheels, respectively, and are operative to constrain the hydraulic motor of each wheel from overrunning relation to the hydraulic pressure delivered to it by the pump.

8. An industrial truck according to claim 6 wherein additional reversing valve means are interposed in the parallel circuit for reversing each of the hydraulic motors relative to the other, selectively.

9. An industrial truck according to claim 4 wherein the coordinating devices are brakes for the wheels, respectively, means yieldably urge the brakes to applied position, and means respective to the hydraulic motors and operated, each by the pressure of the delivery fluid at the input side of its associated hydraulic motor, when said pressure at the input side drops below a predetermined level, to apply its associated brake in an inverse proportional relation to the pressure at said input side.

10. An industrial truck according to claim 1 wherein additional fixed delivery pump means are driven by said electric motor means, and additional valve means are provided for connecting the pressure side of the fixed delivery pump means to, and for disconnecting it from, the pressure side of the variable delivery pump means in advance of the reversing valve means.

11. An industrial truck according to claim 5 and further including a manually operable steering member, and steering control means settable by the movements thereof in opposite directions to decrease the delivery from one pump to its motor when the member is moved in one direction and to decrease the delivery from the other pump to its motor when the member is moved in the opposite direction, a speed control member is provided and is cooperable with the speed control means for increasing and decreasing the delivery from the pumps to the motors, respectively, concurrently, while the steering control means are at different set positions determined by the rotated positions of the steering member.

12. An industrial truck acccording to claim 11 wherein control means are connected to the pumps and are operable when moved in one direction to reduce the displacement of both pumps and when moved in the other direction to increase the displacement of both pumps, auxiliary means are movable by the manually operable steering member to reduce the delivery of each pump separately, selectively, below that determined by said control means, depending upon the direction of movement of the manually operable steering member.

13. An industrial truck according to claim 12 wherein the directional control valves are independently operable, and limit means are associated with the directional control valves, respectively, and are operable upon continued movement in each direction, selectively, of the steering member subsequent to the zero delivery of the pump of which the delivery is being reduced by said movement, to cause the directional control valve of the last mentioned pump to reverse, and upon return of the last mentioned pump to zero delivery by reverse movement of the steering member, to restore the directional valve means to its original setting.

14. An industrial truck according to claim 12 wherein said control means comprise movable control means connected to the manual operable steering member and for movement in opposite directions thereby upon movement of the steering member in opposite directions, respectively, settable means connected to the pumps, respectively, for preselecting the pressure fluid supplied from each to its associated hydraulic motor, movable members drivingly connected to the settable means, respectively, each movable member for moving its associated settable means in opposite directions upon movement of the associated movable member in opposite directions, selectively, and operating means driven by the control means upon movement of the control means in opposite directions for moving one movable member in opposite directions, respectively, while the other movable member remains unmoved, and for moving the other movable member in opposite directions, respectively, while the one movable member remains unmoved.

15. An industrial truck including a chassis, a pair of driving wheels, hydraulic motors connected to the wheels, respectively, a variable delivery pump, an electric driving motor drivingly connected to the pump, a circuit connecting the hydraulic motors in parallel with each other and to the pump, remote control directional valve means connected in the circuit between the pump and hydraulic motors for reversing delivery of pressure fluid to the motors concurrently and independently, selectively, a steering member, limit means associated with the directional control valve means and steering member operable upon continued movement of the steering member in one direction subsequently to zero delivery of the pump to operate the directional control valve means to reverse the hydraulic motor at the side of the truck to which the truck is to turn, and upon movement of the steering member in the opposite direction subsequent to zero delivery of the pump to operate the directional control valve means to reverse the delivery of the pressure fluid to the other of the motors, and upon return of the pump to zero by reverse movement of the steering member toward non-turning position to restore the directional valve means to their original setting, and dirigible wheels carried by the chassis and connected to the steering member for steering thereby.

16. An industrial truck including a chassis, a pair of driving wheels, a hoist mast carried by the chassis, a hoist on the mast, hydraulic motors drivingly connected to the wheels, respectively, a first piston and cylinder assemblage for operating the hoist, a second piston and cylinder assemblage for tilting the mast, a single unidirectional direct current electric motor, a battery carried by the chassis for energizing the electric motor, two separate variable delivery hydraulic pumps connected to the electric motor means and driven thereby, one circuit connecting one pump to the hydraulic motors in parallel and an additional circuit connecting the other pump to the assemblages, said two last mentioned circuits being normally disconnected from each other, valve means for controlling the direction of flow of pressure fluid in said one circuit to the hydraulic motors and in the additional circuit to the assemblages, respectively, and additional valve means for diverting the pressure fluid from the additional circuit to the pressure side of said one circuit.

17. An industrial truck including a chassis, a pair of driving wheel sub-assemblages, hydraulic motors for the wheels, respectively, a hoist including a mast, pivot means on the mast for connecting the mast to the chassis for tilting relative to the chassis, hydraulic pump means, power means for driving the pump means, a circuit connecting the pump means to the hydraulic motors, a hydraulic piston and cylinder for tilting the mast, a hoist circuit connecting the cylinder to the pump means, characterized in that said sub-assemblages are unconnected with each other, each assembly comprises a housing, a drive wheel rotatably mounted on the housing, a hydraulic motor mounted on the housing, transmission gearing on the housing drivingly connecting the motor and wheel, a mast pivot bearing means on the housing, complementary to said pivot means, and said housing having a portion detachably connected to the chassis and rigidly securing the sub-assemblage fixedly in operating position on the chassis.

References Cited in the file of this patent
UNITED STATES PATENTS

| | | |
|---|---|---|
| 2,774,436 | Ferris | Dec. 18, 1956 |
| 2,986,295 | Shaffer | May 30, 1961 |

FOREIGN PATENTS

| | | |
|---|---|---|
| 565,537 | Belgium | Mar. 31, 1958 |
| 1,048,829 | Germany | Jan. 15, 1959 |
| 1,065,328 | Germany | Sept. 10, 1959 |